(12) United States Patent
Irving et al.

(10) Patent No.: US 7,238,327 B2
(45) Date of Patent: Jul. 3, 2007

(54) METHOD OF ATTACHING INTERNAL HEAT SHIELD IN AUTOMOTIVE CATALYTIC CONVERTERS

(75) Inventors: Carl Irving, Romulus, MI (US); Joseph Michael Lanzesira, Monroe, MI (US); Chris Darr, Northwood, OH (US); Houliang Li, Novi, MI (US); Darren Nance, Brighton, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 841 days.

(21) Appl. No.: 10/315,824

(22) Filed: Dec. 10, 2002

(65) Prior Publication Data

US 2004/0109796 A1 Jun. 10, 2004

(51) Int. Cl.
*B01D 50/00* (2006.01)
*B01D 53/34* (2006.01)
*F01N 3/10* (2006.01)
*B21D 39/00* (2006.01)

(52) U.S. Cl. .............. 422/179; 422/180; 422/211; 422/177; 422/168; 422/171; 422/176; 422/220; 422/221; 60/299; 60/301; 29/505; 29/506

(58) Field of Classification Search ............ 422/177, 422/179, 180, 171; 60/299
See application file for complete search history.

(56) References Cited

U.S. PATENT DOCUMENTS

| | | | |
|---|---|---|---|
| 4,235,843 A | 11/1980 | Tadokoro et al. | 422/172 |
| 4,501,118 A | 2/1985 | Thayer et al. | 60/301 |
| 4,927,608 A * | 5/1990 | Worner et al. | 422/179 |
| 5,036,585 A | 8/1991 | Schweinfurth | 29/890.08 |
| 5,398,407 A | 3/1995 | Stuer | 29/890 |
| 5,408,828 A | 4/1995 | Kreucher et al. | 60/299 |
| 5,674,461 A | 10/1997 | Kato et al. | 422/179 |
| 5,683,660 A * | 11/1997 | Wirth et al. | 422/179 |
| 5,829,132 A * | 11/1998 | Sickels et al. | 422/179 |
| 6,128,821 A * | 10/2000 | Grescher | 422/179 |
| 6,199,659 B1 | 3/2001 | Allman | 181/282 |
| 6,334,981 B1 | 1/2002 | Wieres | 422/177 |
| 6,919,052 B2 * | 7/2005 | Foster et al. | 422/179 |
| 2002/0062562 A1* | 5/2002 | Li et al. | 29/890 |

* cited by examiner

*Primary Examiner*—Glenn Caldarola
*Assistant Examiner*—Kaity Handal
(74) *Attorney, Agent, or Firm*—MacMillan, Sobanski & Todd, LLC

(57) ABSTRACT

A catalytic converter and method for its assembly including an external shell formed in two halves containing a catalytic substrate, two internal shields and two-piece inlet and outlet cones. The inlet and outlet cones are attached as halves to each side of the external shell, and are assembled to each other as the external shells are assembled.

8 Claims, 4 Drawing Sheets

METHOD OF ATTACHING INTERNAL HEAT SHIELD IN AUTOMOTIVE CATALYTIC CONVERTERS

FIELD OF THE INVENTION

The present invention relates generally to a catalytic converter, more particularly, the present invention is related to a method of attaching the internal shields in an automotive catalytic converter and catalytic converter assembly.

DESCRIPTION OF PRIOR ART

Vehicles that run on fossil fuels are a source of air pollution throughout the world. Modern vehicle engines carefully control the amount of fuel they burn, but the combustion is not perfect and some undesirable emissions are produced in car engines such as carbon monoxide, hydrocarbons and nitrogen oxides.

To reduce emissions, vehicles use a device called a catalytic converter to treat the engine emissions. Catalytic converters typically incorporate a ceramic substrate coated with a metal catalyst such as platinum or palladium. The catalysts promote further combustion and chemical reactions to change the carbon monoxide, hydrocarbon and nitrogen oxide molecules to non-harmful molecules. The chemical process occurring in the catalytic converter are exothermic reactions, releasing heat into the exhaust gas stream and the converter housing.

Catalytic converters traditionally contain an external shell that surrounds the substrate and inlet and outlet cone assemblies that attach the catalytic converter to the vehicle exhaust pipes or components. Heat shields are provided to prevent overheating of the floor pan, which is undesirable for the vehicle occupants and further to reduce the likelihood of initiating combustion of materials below the vehicle. The internal cones (or internal shields) are generally one-piece or two-piece designs that are spot welded to the external shell at the inlet and outlet of the converter assembly. The two halves of the external shell are then pressed together into the proper assembly position and finally welded.

The current design has several main problems associated with locating of the internal cones and substrate and the external shell gaps. When the external shells are pressed together, it is difficult to locate the internal shields, which is the first problem. The second concern occurs when the substrate sizes vary significantly. When this occurs, it is difficult to close the gap between the external shell and the substrate due to the existence of the internal shields. A further problem with previous designs is that manufacturers do not weld the internal portion of the cone to the external shell. This can cause a noise and vibration problem and also potentially damage the ceramic substrate.

Therefore, there is a need in the automotive industry, as well as in other industries, for an improved process of attaching the internal shields of a catalytic converter to the external shells.

BRIEF SUMMARY OF THE INVENTION

In accordance with the present invention, the internal cones can be manufactured in two halves, similar to the external shells. The external shells have perimeter flanges for attaching the shields together at the final step of the process. Each half of an internal cone is spot welded in a pocket on each side of each half of the external shell. This attachment supports and locates the internal cone. The substrate is then located in between the internal cones on the external shell. The two halves of the external shell can then be welded together at its perimeter flanges.

The assembly of the internal cone halves and the external shell halves is made when perimeter flanges are raised on one half of the shell to fit over straight flanges on the other half of the shell. The design is similar to how a shoebox lid fits over the main shoebox.

Additional benefits and advantages of the present invention will become apparent to those skilled in the art to which the present invention relates from the subsequent description of the preferred embodiments and the appended claims, taken in conjunction with the accompanying drawings.

DETAILED DESCRIPTION

The foregoing discussion discloses and describes the preferred embodiment of the invention. One skilled in the art will readily recognize from such discussion, and from the accompanying drawings and claims, that changes and modifications can be made to the invention without departing from the true spirit and fair scope of the invention as defined in the following claims. The invention has been described in an illustrative manner, and it is to be understood that the terminology which has been used is intended to be in the nature of words of description rather than of limitation.

Figure 1:
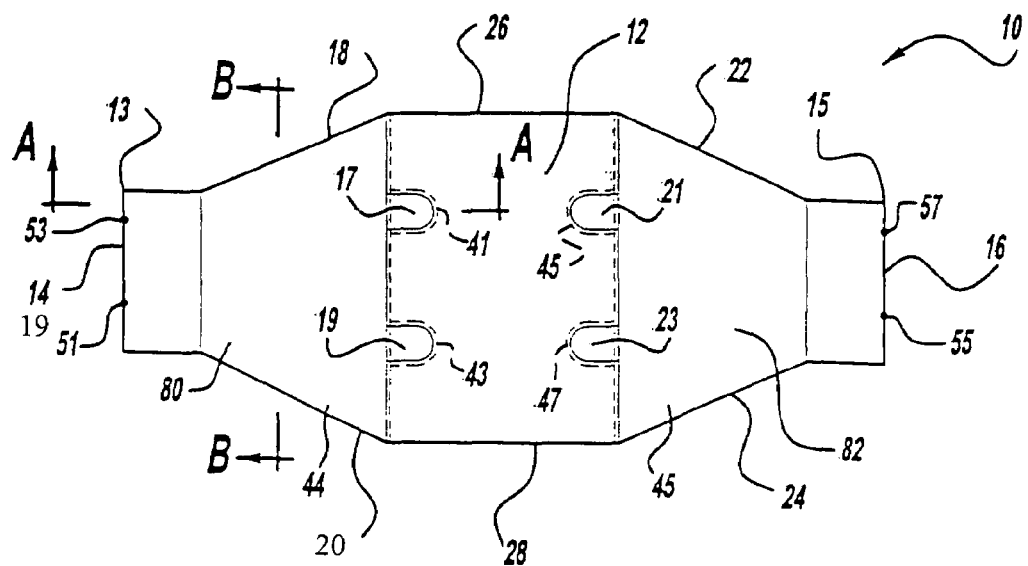
FIG. 1 is top view of the straight cone type catalytic converter of the present invention.

Referring now to FIG. 1, a top view of the catalytic converter 10 of the present invention is shown. Internal cones 80 and 82 and catalytic substrate 48 (shown in FIG. 5) are contained by the external shell 12 of the catalytic converter 10. The external shell 12 is a two piece design and is made up of external shell top 40 and external shell bottom 42 (shown in FIG. 3). The external shell 12 contains inlet 14 and outlet 16, which attach to exhaust system piping (not shown). Inlet 14 and outlet 16 are substantially centered along inlet side 13 and outlet side 15 of external shell 12. Engine emissions enter the catalytic converter 10 through inlet 14, are treated by the catalytic substrate 48 and exit through outlet 16. The inlet end 14, outlet end 16, and external shell 12 are aligned about a central axis 19.

Inlet 14 and outlet 16 are the narrowest points on external shell 12 of the catalytic converter 10. From inlet 14, the external shell 12 widens through widening sides 18 and 20, which are of substantially the same length. Widening sides 18 and 20 end at straight sides 26 and 28, respectively. The external shell 12 of the catalytic converter 10 reaches its widest point along straight sides 26 and 28, which are also of substantially the same length. The straight sides 26 and 28 extend at least the length of the catalytic substrate 48 until narrowing sides 22 and 24, respectively, are reached. The narrowing sides 22 and 24 are of substantially the same length. The external shell 12 then narrows again along narrowing sides 22 and 24 until outlet 16 is reached.

Inlet internal cone 80 and outlet internal cone 82, shown by shadowed lines in their location inside external shell top 40, are also two-piece designs. Inlet internal cone 80 contains tabs 41 and 43 on inlet internal cone top 44. Outlet internal cone 82 contains tabs 45 and 47. Attachment tabs 17, 19, 21 and 23 are recessed on external shell top 40. Inlet internal cone 80 tabs 41 and 43 is attached to the external shell top 40 at attachment points 17 and 19 on external shell top 40, respectively, by a manufacturing process such as spot welding, although other manufacturing processes are possible. Similarly, outlet internal cone 82 tabs 45 and 47 are attached to external shell top 40 at attachment points 21 and 23, respectively.

The inlet internal cone top 44 and external shell top 40 are also attached, by spot welding or a similar process, at inlet side 13 at the inlet 14 of the catalytic converter 10 at attachment points 51 and 53. Similarly, the outlet internal cone top 45 and external shell top 40 are attached at outlet side 15 of the catalytic converter 10 at attachment points 55 and 57.

Figure 2:
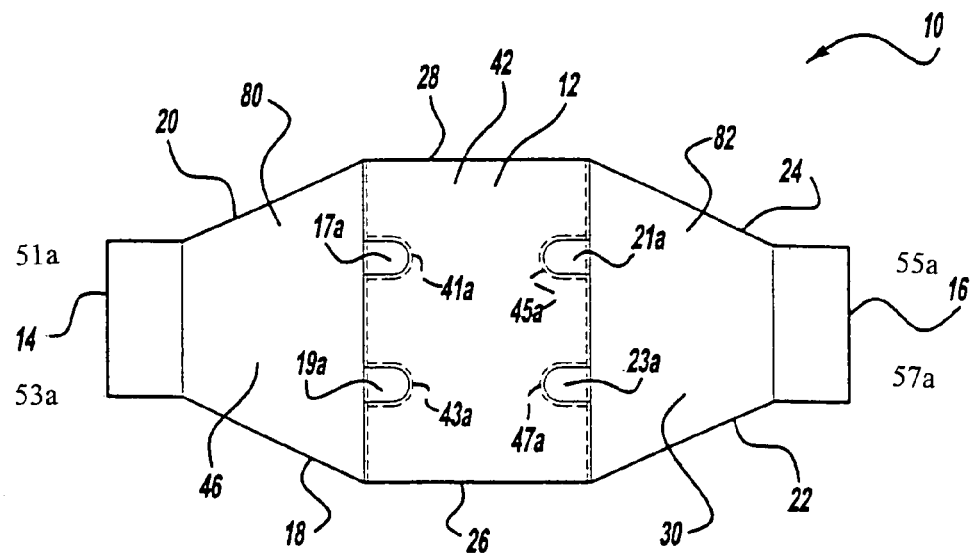
FIG. 2 is a bottom view of FIG. 1.

Now referring to FIG. 2, a bottom view of the catalytic converter 10 of the present invention is shown. Inlet internal cone 80 contains tabs 41a and 43a on inlet internal cone bottom 46. Outlet internal cone 82 has an external internal shield bottom 30, which contains tabs 45a and 47a. Attachment points 17a, 19a, 21a and 23a are recessed on external shell bottom 42. Tabs 41a and 43a are attached to the external shell bottom 42 at attachment points 17a and 19a on external shell bottom 42, respectively. Similarly, tabs 45a and 47a on the outlet internal shield bottom 30 are attached to external shell bottom 42 at attachment points 21a and 23a, respectively.

The inlet internal cone bottom 46 and external shell bottom 42 are also attached, by spot welding or a similar process, at inlet side 13 at the inlet 14 of the catalytic converter 10 at attachment points 51a and 53a. Similarly, the outlet internal cone bottom 45 and external shell bottom 42 are attached at outlet side 15 of the catalytic converter 10 at attachment points 55a and 57a.

Figure 3:
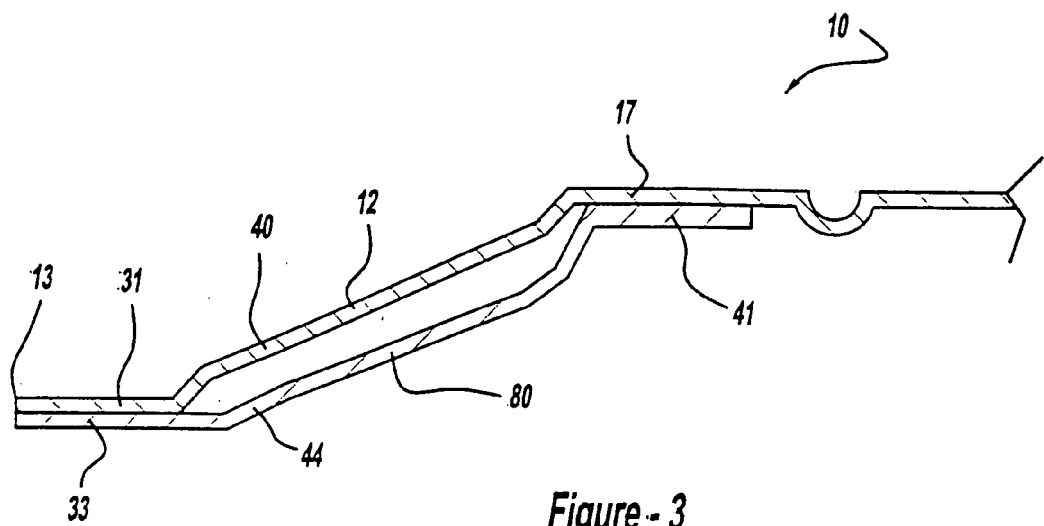
FIG. 3 is a side sectional view of FIG. 1 cut through line A-A.

Now referring to FIG. 3, a side sectional view of the catalytic converter 10 is shown through the lengthwise line A-A of the external shell top 40 and internal cone top 44. The external shell 12 has external shell top 40. The internal cone 80 has inlet internal cone top 44. At inlet side 13, the external shell top 40 contains attachment flange 31, which is recessed in external shell top 40 and the inlet internal cone top 44 contains attachment flange 33. The external shell top 40 is attached to the inlet internal cone top 44 by joining attachment flanges 31 and 33 together by a method such as spot welding.

Similarly, the external shell top 40 is attached to the inlet internal cone top 44 at tab 41, which is also recessed in the external shell top 40 on the inlet internal cone top 44. Tab 41 is joined, by spot welding or a similar process, to the external shell top at attachment point 17.

Figure 4:
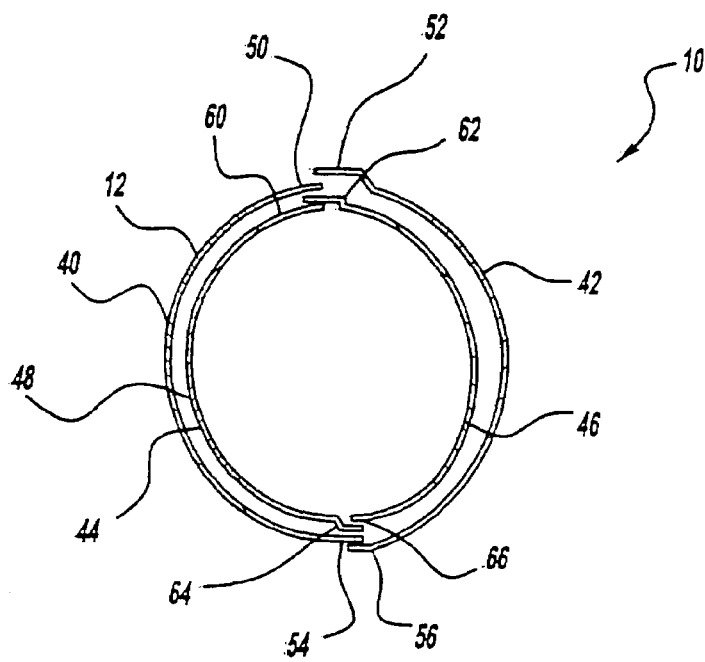
FIG. 4 is a side sectional view of FIG. 1 cut through line B-B.

Now referring to FIG. 4 a side sectional view through width line B-B of the catalytic converter 10 is shown. External shell 12 is made up of two pieces, external shell top 40 and external shell bottom 42. Inlet internal cone 80 is also made up of two pieces, internal cone top 44 and internal cone bottom 46. External shell top 40 encases internal cone top 44. External shell bottom 42 encases internal cone bottom 46.

To aid assembly, the external shell top 40 and external shell bottom 42 contain straight and raised end flanges. The external shell top 40 contains straight flange 50 and straight flange 54 and the external shell bottom 42 contains raised flange 56 and raised flange 52. When the external shell 12 is assembled as one piece, raised flange 52 of external shell bottom 42 fits atop straight flange 50 of external shell top 40. On the opposite side of external shell 12, straight flange 54 of external shell bottom 40 sits beneath raised flange 56 of external shell bottom 42.

Concurrent with the assembly of external shell 12, inlet internal cone 80 is assembled. To aid assembly of the internal cone top 44 and internal cone bottom 46, the internal cone top 44 contains straight flange 60 and raised flange 64 and the internal cone bottom 46 contains straight flange 66 and raised flange 62. When the internal cone 12 is assembled, raised flange 62 of internal cone bottom 46 fits atop straight flange 60 of internal cone top 44. On the opposite side of internal cone 12, raised flange 64 of internal cone bottom 44 sits atop straight flange 66 of internal cone bottom 46.

Figure 5:
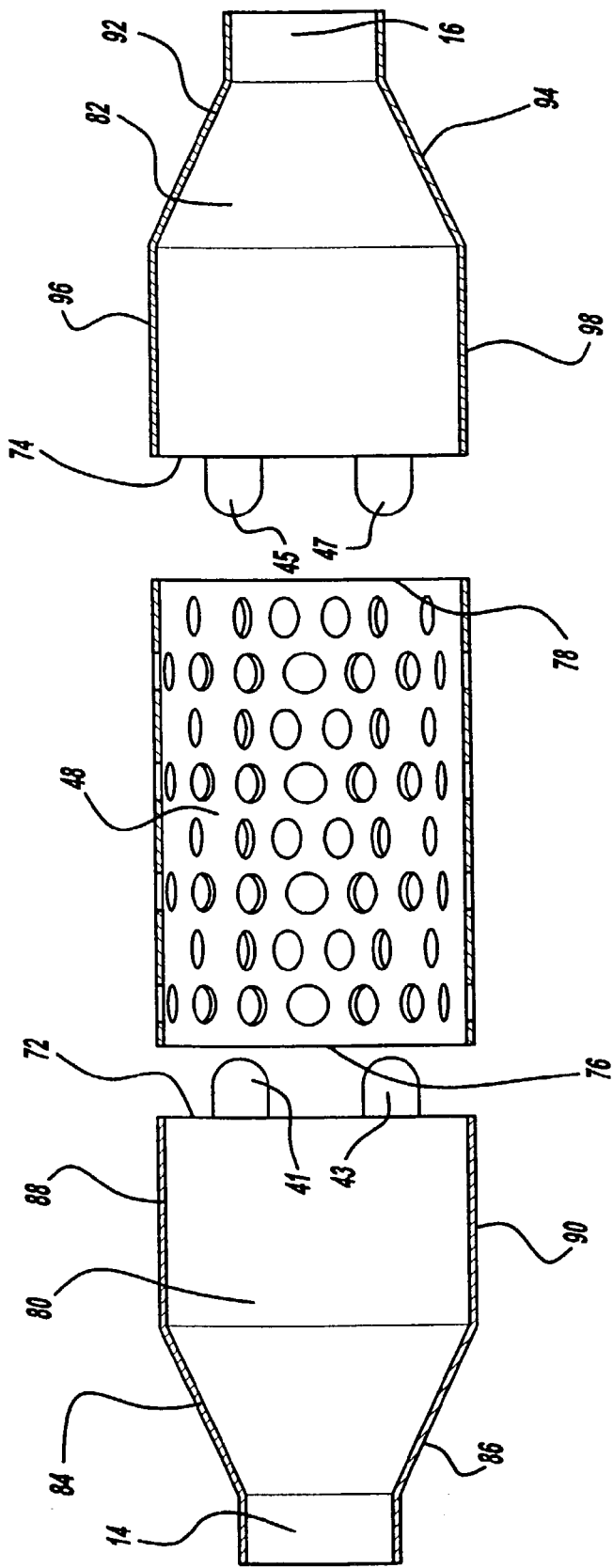
FIG. 5 is a top view of the catalytic converter of the present invention with the external shell removed.

Now referring to FIG. 5, a top view of the catalytic converter 10 is shown with the external shell 12 removed. Catalytic substrate 48 sits between inlet internal cone 80 and outlet internal cone 82.

Similar to the shape of external shell 12, inlet internal cone 80 has its narrowest point at inlet 14. From inlet 14, the internal inlet cone 80 widens through widening sides 84 and 86, which are substantially of the same length. Widening sides 84 and 86 end at straight sides 88 and 90, respectively. Straight sides 88 and 90 are of substantially the same length. The internal inlet cone 80 of the catalytic converter 10 reaches its widest point along straight sides 88 and 90. The straight sides 88 and 90 end at internal side 72. Internal side 72 of internal inlet cone 80 mates with inlet side 76 of the catalytic substrate 48.

On the opposite side of catalytic substrate 48, exit side 78 of the catalytic substrate 48 mates with internal side 74 of the outlet internal cone 82. Straight sides 96 and 98, which are of substantially the same length, of outlet internal cone 82 extend from the internal side 74 and are the widest point of outlet internal cone 82. Straight sides 96 and 98 end at narrowing sides 92 and 94, respectively. The narrowing sides 92 and 94, which are of substantially the same length, narrow the width of the outlet internal cone 82 until outlet 16 is reached, which is the outlet internal cone's 82 narrowest point.

Figure 6:
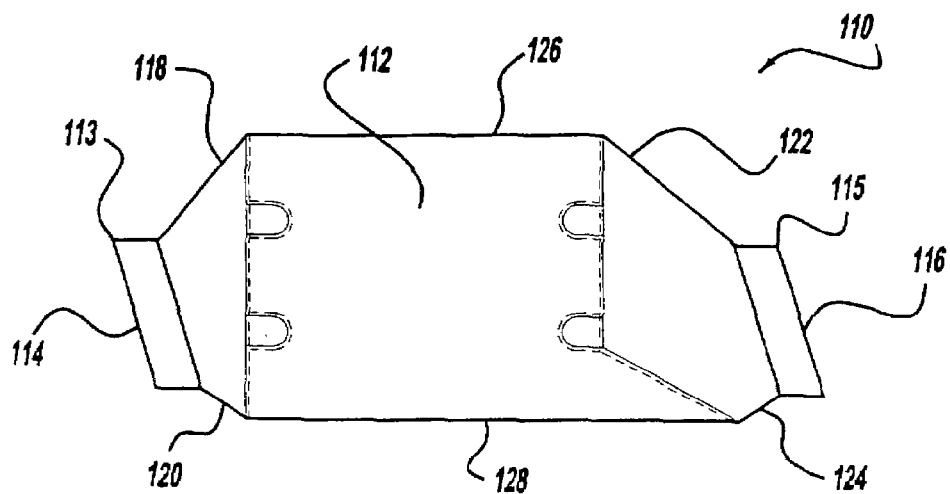
FIG. 6 is a top view of an alternate embodiment of the catalytic converter of the present invention with offset cones.

Now referring to FIG. 6, an alternate embodiment of the present invention is shown in a top view. Catalytic converter 110 contains external shell 112 with inlet 114 and outlet 116. Inlet 114 and outlet 116 are the narrowest points on catalytic converter 110.

From inlet 114, the external shell 112 widens through widening sides 118 and 120, which are of differing lengths. In this embodiment, widening side 118 is substantially longer than widening side 120, offsetting the location of inlet 114 along inlet side 113 of external shell 112. Widening sides 118 and 120 end at straight sides 126 and 128, respectively.

The external shell 112 of the catalytic converter 110 reaches its widest point along straight sides 126 and 128, which can be of the same or substantially different lengths. Straight side 126 is shorter than straight side 128 in this embodiment. The straight sides 126 and 128 extend at least the length of the catalytic substrate 48 until narrowing sides 122 and 124, respectively, are reached. The narrowing sides 122 and 124 can be the same or of substantially different lengths. In this embodiment, narrowing side 122 is longer than narrowing side 124. The external shell 112 then narrows again along narrowing sides 122 and 124 until outlet 116 is reached. Outlet 116 is offset from center along exit side 115 of external shell 112.

Figure 7:
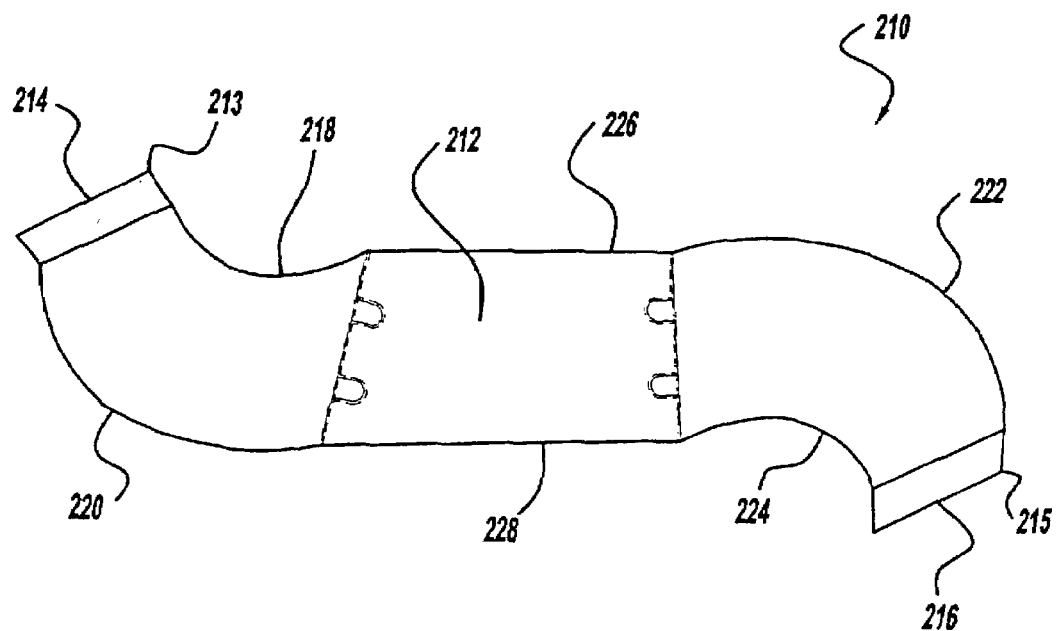
FIG. 7 is a top view of a further embodiment of the catalytic converter of the present invention with oblique cones.

Now referring to FIG. 7, a further embodiment of the present invention is shown in a top view. Catalytic converter 210 contains external shell 212 with inlet 214 and outlet 216. Inlet 214 and outlet 216 are the narrowest points on catalytic converter 210.

From inlet 214, the external shell 212 widens through widening sides 218 and 220, which are of differing lengths. In this embodiment, widening side 218 is an arc shape and is substantially longer than widening side 220, which is also of an arc shape. The location of inlet 214 is at an oblique angle along inlet side 213 of external shell 212. Widening sides 218 and 220 end at straight sides 226 and 228, respectively.

The external shell 212 of the catalytic converter 210 reaches its widest point along straight sides 226 and 228, which are of substantially the same or different lengths. The straight sides 226 and 228 extend at least the length of the catalytic substrate 48 until narrowing sides 222 and 224, respectively, are reached. The narrowing sides 222 and 224 are of substantially different lengths. In this embodiment, narrowing side 222 is an arc shape and is longer than narrowing side 224, which is also an arc shape. The external shell 212 then narrows again along narrowing sides 222 and 224 until outlet 216 is reached. Outlet 216 is at an oblique angle along exit side 215 of external shell 212.

While the above description constitutes the preferred embodiments of the present invention, it will be appreciated that the invention is susceptible to modification, variation and change without departing from the proper scope and fair meaning of the accompanying claims.

The invention claimed is:

1. A catalytic converter assembly for a motor vehicle comprising:
- an external shell formed of two halves including a first half and a second half, the external shell halves mating together along first perimeter flanges to form an inlet end, an outlet end and a center portion between the inlet and outlet ends, the inlet and outlet ends adapted for connection with components of an exhaust system of the motor vehicle,
- a catalyst substrate that is enclosed within the center portion of the external shell,
- a first internal shield formed of two halves including a first half and a second half, the first internal shield halves mating together along second perimeter flanges and each of the halves including an end flange and at least one local tab that extends axially from a circumferential edge of the first internal shield and extends laterally along said edge a short circumferential length parallel to an adjacent contour of the external shell, which tab contacts an external shell half enabling a connection of a first internal shield half to an external shell half, with the end flange contacting the external shell halves at their inlet ends and the tabs contacting the external shell center portion, and
- a second internal shield formed of two halves including a first half and a second half, the second internal shield halves mating together along third perimeter flanges and each of the halves including an end flange and at least one local tab extends axially from a circumferential edge of the second internal shield and extends laterally along said edge a short circumferential length parallel to an adjacent contour of the external shell, which tab contacts an external shell half enabling a connection of the second internal shield half to an external shell half, with the end flange contacting the external shell halves at their outlet ends and the tabs contacting the external shell center portion.

2. The catalytic converter of claim 1 wherein the first and second internal shield halves are attached to the external shell halves by spot welding at the tabs.

3. The catalytic convener of claim 1 wherein the inlet end and outlet end and external shell are aligned with a central axis.

4. The catalytic converter of claim 1 wherein a centerline through the center of the inlet end and outlet side end is offset from a centerline of the external shell.

5. The catalytic converter of claim 1 wherein a centerline trough the center of the inlet side end and outlet end is at an oblique angle from a centerline of the external shell.

6. The catalytic converter of claim 1 wherein the, perimeter flanges of the external shell first half is stepped on at least one side to fit over the perimeter flanges of the external shell second half.

7. The catalytic converter of claim 1 wherein the perimeter flanges of the first internal shield first half is stepped on at least one side to fit over the perimeter flange of the first internal shield second half.

8. The catalytic converter of claim 1 wherein the perimeter flanges of the second internal shield first half is stepped on at least one side to fit over the perimeter flange of the second internal shield second half.

* * * * *